Patented June 30, 1936

2,046,031

UNITED STATES PATENT OFFICE 2,046,031

PROCESS FOR THE PRODUCTION OF PHOSPHORIC ACID TRIESTERS OF ALIPHATIC ALCOHOLS

Martin Mugdan and Johann Sixt, Munich, Germany, assignors to Consortium fur Elektrochemische Industrie G. m. b. H., Munich, Germany, a corporation of Germany No Drawing. Application March 29, 1935, Serial No. 13,699. In Germany April 18, 1934

5 Claims. (Cl. 260—99.20)

This invention relates to the production of phosphoric acid esters of aliphatic alcohols, and has for its object to simplify and cheapen previous processes.

The conventional processes for the production of phosphoric acid esters, such as trialkyl phosphates from an aliphatic alcohol and phosphorus oxychloride, produce low yields because of the noxious reaction of the formed hydrogen chloride upon the alkyl phosphate, which occurs particularly at elevated temperature by reason of the formation of acid esters and chloralkyl. German Patent #517,538 avoids this by having the reaction of the phosphorus oxychloride with the alcohol take place in the presence of organic amines, which bind the hydrogen chloride as formed.

According to the process described hereunder, we have found that phosphoric acid esters may be obtained in a simpler and more economical manner.

The selected aliphatic alcohol is treated with phosphorus oxychloride at such moderate temperature as to preclude the formation of chloralkyl. Upon completion of this reaction, anhydrous ammonia equivalent to the phosphorus-oxychloride is added at a moderate temperature so that the hydrogen chloride as formed reacts with the ammonia to form ammonium chloride. The ammonium chloride can then be separated from the ester by filtration or centrifuging and the ester freed from the surplus alcohol by fractionation. The advantages of this two step process are that, instead of organic bases, the far cheaper ammonia is utilized. As ammonia reacts with phosphorus oxychloride, the treatment with ammonia takes place only upon termination of the reaction of the phosphorus-oxychloride with alcohol. In the above mentioned German Patent #517,538, the one step reaction is in the presence of an organic base. In our process, therefore, there is a separation of the two exothermic reactions—reaction of phosphorus oxychloride upon an alcohol—and of hydrogen chloride upon ammonia. This facilitates the elimination of the heat, as both steps should take place at a low temperature. Moreover, the present process is not confined, like the conventional one, to the simultaneous utilization of a special solvent. As the formed ammonium chloride is almost insoluble in alcohols, an excess is not objectionable, whereas the hydrochlorides of the organic bases are soluble in alcohols.

Example 1

70 g. of phosphorus oxychloride are slowly poured into 350 g. of absolute ethyl alcohol while stirring, and cooled to about +30° C. Only a small amount of hydrogen chloride and no ethyl chloride escapes during the reaction. Ammonia gas was then introduced while stirring and cooling to approximately maintain said temperature until a test specimen upon being mixed with water, gave a neutral reaction with methyl orange. The ammonium chloride which separated was drained off, was washed with some alcohol, and the ester contained in the filtrate was freed from excess alcohol by distillation. The pure ester was obtained from the residue by vacuum distillation. The output—with reference to $POCl_3$ used—amounted to 86% of theoretical. The ammonium chloride obtained can be converted into ammonia by the conventional method, which can then be used again, as well as the surplus alcohol.

Example 2

The process was the same as in Example 1, with the difference that, instead of 350 g. of ethyl alcohol 350 g. of butyl alcohol were used and the operation was performed at a maximum temperature of 50°. About 95% of the theoretical output in tributyl phosphate was obtained, figured with reference to the phosphorus oxychloride.

Ammonia dissolved in alcohol can also be used. The evaporation heat of liquid ammonia can also be made available for eliminating the heat of reaction by causing liquid ammonia to evaporate in a metal coil located inside of the reaction vessel, and controlling the reaction temperature by the supply of liquid ammonia.

While we have given two examples of aliphatic alcohols, we do not restrict ourselves thereto as the reaction is typical of aliphatic alcohols generally and is equally applicable to higher aliphatic alcohols such as propyl, amyl, etc. alcohols, for obtaining the corresponding phosphoric acid esters.

The invention claimed is:

1. Process for the production of phosphoric acid esters of aliphatic alcohols from phosphorus oxychloride and the corresponding alcohol, comprising treating an aliphatic alcohol with phosphorous oxychloride, treating the reaction product with anhydrous ammonia while maintaining a temperature such that chloralkyl is not freed, and separating the formed ammonium chloride.

2. Process for the production of triethyl phosphate from ethyl alcohol and phosphorus oxychloride, comprising treating ethyl alcohol with phosphorus oxychloride while being cooled, treating the reaction product with anhydrous ammonia while maintaining a temperature at which ethyl chloride is not freed, and separating the formed ammonium chloride from the ester.

3. Process for the production of phosphoric acid esters of aliphatic alcohols from phosphorus oxychloride and the corresponding alcohol, comprising treating an aliphatic alcohol which forms a water-soluble phosphoric acid ester with phosphorus oxychloride, treating the reaction product with anhydrous ammonia while maintaining a temperature such that chloralkyl is not freed, and separating the formed ammonium chloride.

4. Process for the production of phosphoric acid esters of aliphatic alcohols from phosphorus oxychloride and the corresponding alcohol, comprising treating an aliphatic alcohol selected from the group consisting of ethyl, propyl and butyl alcohols with phosphorus oxychloride, treating the reaction product with anhydrous ammonia while maintaining a temperature such that chloralkyl is not freed, and separating the formed ammonium chloride.

5. Process for the production of phosphoric acid esters of aliphatic alcohols from phosphorus oxychloride and the corresponding alcohol, comprising treating an aliphatic alcohol having less than 5 carbon atoms with phosphorus oxychloride, treating the reaction product with anhydrous ammonia while maintaining a temperature such that chloralkyl is not freed, and separating the formed ammonium chloride.

MARTIN MUGDAN.
JOHANN SIXT.